(12) United States Patent
Makki et al.

(10) Patent No.: US 11,799,539 B2
(45) Date of Patent: Oct. 24, 2023

(54) RELAYING IN A WIRELESS COMMUNICATION NETWORK

(71) Applicant: Telefonaktiebolaget LM Ericsson (publ), Stockholm (SE)

(72) Inventors: Behrooz Makki, Gothenburg (SE); Mikael Coldrey, Borås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 235 days.

(21) Appl. No.: 17/436,433

(22) PCT Filed: Mar. 8, 2019

(86) PCT No.: PCT/EP2019/055829
§ 371 (c)(1),
(2) Date: Sep. 3, 2021

(87) PCT Pub. No.: WO2020/182268
PCT Pub. Date: Sep. 17, 2020

(65) Prior Publication Data
US 2022/0173792 A1     Jun. 2, 2022

(51) Int. Cl.
*H04B 7/155* (2006.01)
*H04L 1/00* (2006.01)

(52) U.S. Cl.
CPC ........... *H04B 7/155* (2013.01); *H04L 1/0045* (2013.01)

(58) Field of Classification Search
CPC ...... H03M 13/35; H03M 13/41; H03M 13/05; H03M 13/6356; H03M 13/09;
(Continued)

(56) References Cited

U.S. PATENT DOCUMENTS

2009/0201900 A1    8/2009   Suga
2010/0054173 A1    3/2010   Kim et al.

FOREIGN PATENT DOCUMENTS

CN     106161325 A  *  11/2016  ........... H04L 1/0053
CN     107919944 A  *  4/2018   ........ H03M 13/1171
(Continued)

OTHER PUBLICATIONS

International Search Report and Written Opinion dated Nov. 18, 2019 for International Application No. PCT/EP2019/055829 filed Mar. 8, 2019, consisting of 11-pages.
(Continued)

*Primary Examiner* — Khalid W Shaheed
(74) *Attorney, Agent, or Firm* — Christopher & Weisberg, P.A.

(57) ABSTRACT

The present disclosure relates to a first type node in a wireless communication system, wherein the first type node is adapted to: communicate with at least one other first type node in the wireless communication system over a corresponding channel receive a plurality of signals, each signal being associated with a corresponding decoding error probability, from the other first type node estimate the decoding error probability for each signal sort the signals in a decoding order according to the estimated decoding error probability, decode the signals one at the time from the lowest estimated decoding error probability to the highest estimated decoding error probability until decoding for a certain signal is determined to have failed, request re-transmission of the signal for which decoding has been determined to have failed, and to request re-transmission of all signals having higher decoding error probability than the signal for which decoding has been determined to have failed.

20 Claims, 3 Drawing Sheets

(58) Field of Classification Search
CPC ............ H03M 13/6306; H03M 13/25; H03M 13/3961; H03M 13/6343; H04L 1/20; H04L 1/0054; H04L 1/0047; H04L 1/0061; G06F 11/1016; H04W 24/08; H04W 52/20
See application file for complete search history.

(56) References Cited

FOREIGN PATENT DOCUMENTS

EP         3244561 B1 *  8/2019  ......... H04B 10/2581
WO   WO-2005064801 A1 *  7/2005  ............. H04L 1/005

OTHER PUBLICATIONS

3GPP TSG RAN WG1 Meeting #95 R1-1812859; Title: Enhancements to support NR backhaul links; Agenda Item: 7.2.3.1; Source: AT&T; Document for: Discussion/Approval; Date and Location: Oct. 8-12, 2018, Chengdu, China, consisting of 13-pages.
3GPP TSG RAN WG1 Meeting #94 R1-1808511; Title: Discussions on NR IAB support; Agenda Item: 7.2.3.1; Source: LG Electronics; Document for: Discussion and decision; Date and Location: Aug. 20-24, 2018, Gothenburg, Sweden, consisting of 8-pages.

* cited by examiner

RELAYING IN A WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/EP2019/055829, filed Mar. 8, 2019 entitled "IMPROVED RELAYING IN A WIRELESS COMMUNICATION NETWORK," the entirety of which is incorporated herein by reference.

TECHNICAL FIELD

The present disclosure relates to relaying in wireless communication networks, in particular in integrated access and backhaul (IAB) networks.

BACKGROUND

The fifth generation of wireless networks (5G) must provide high-rate data streams for everyone everywhere at any time. To meet such demands, it is required to use large bandwidths. Here, it is mainly concentrated on millimeter wave-based, potentially, massive multiple-input and multiple-output (MMIMO), links as a key enabler to obtain sufficiently large bandwidths/data rates. Importantly, the presence of very wide bandwidths makes it possible to include the wireless backhaul transport in the same spectrum as the wireless access. In such a setup, there is thus a sharing of radio resources between access and backhaul links which implies that access and backhaul links compete over the same radio resources pool.

For this reason, 3GPP has considered such integrated access and backhaul (IAB) network configurations where an access point (AP), that for example can be fiber-connected, provides other APs as well as the customer-premises equipments (CPEs) inside its cell area with wireless backhaul and access connections, respectively. The access-integrated backhaul link can either be a single-hop or multi-hop link in an IAB network. In a multi-hop deployment, the IAB network from one AP is relayed along a certain route from AP to AP until it reaches its destination. IAB networks can thus have either star-like configuration with multiple APs wirelessly backhauled through direct single-hop connections to the fiber-connected AP, or a cascade configuration with APs wirelessly connected to the fiber-connected AP in a multi-hop fashion.

Among the advantageous of IAB networks are the followings:

Cost Reduction

A fiber optic link is relatively expensive in metropolitan areas, with a majority of the total figure tied to trenching and installation. For this reason, as well as the traffic jams and infrastructure displacements, some cities have considered a moratorium on fiber trenching specially in historical areas. In such scenarios, millimeter wave-based wireless backhaul is the best alternative providing almost the same rate as fiber optic with significantly less price and no digging.

Link Quality Enhancement

Compared to the direct macro base station (BS)-CPE link, less path loss/shadowing, and higher line-of-sight (LOS) connection probability are expected for the wirelessly backhauled AP-CPE connections within small cells. As a result, better channel quality is experienced in such small cells, compared to the cases with direct macro BS-CPE connection.

Long-Term Network Planning

IAB systems are of most interest in small cell backhaul and fixed wireless access (FWA) networks with stationary APs/CPEs. This makes it possible to predict the channel quality and perform accurate network planning for multiple packet transmissions.

In an IAB network, aggregated data is accumulated from multiple hops which leads to high decoding delay/complexity and large buffer size requirement for each hop. Particularly, the AP-AP backhaul links transfer an aggregated data of a large number of CPEs served by, e.g., different APs of the multi-hop network. For example, end-to-end delay, buffer cost and complexity of the conventional techniques such as hybrid automatic repeat request (HARQ) increase with the number of hops/CPEs per hop significantly.

For this reason, it has been suggested to limit the number of hops to ≤2. To be able to support a plurality of CPEs/hops in delay-sensitive applications, it is desired to reduce the end-to-end data transmission delay as well as the implementation complexity and the buffering cost.

Generally, there is a desire to have a node in a wireless communication system which communicate with at least one other node, where end-to-end data transmission delay, such as decoding delay, as well as the implementation complexity are reduced, while the load balancing in the AP-AP backhaul links is improved.

SUMMARY

It is an object of the present disclosure to provide a node in a wireless communication system which communicate with at least one other node, where end-to-end data transmission delay as well as the implementation complexity are reduced, while the load balancing in the AP-AP backhaul links is improved.

This object is obtained by means of a first type node in a wireless communication system. The first type node is adapted to communicate with at least one other first type node in the wireless communication system over a corresponding channel by means of one of at least one type of signal relaying that employs decoding and encoding, and to receive a plurality of signals, each signal being associated with a corresponding decoding error probability, from the other first type node, and to estimate the decoding error probability for each signal. The first type node is also adapted to sort the signals in a decoding order according to the estimated decoding error probability, and to decode the signals one at the time from the lowest estimated decoding error probability to the highest estimated decoding error probability until decoding for a certain signal is determined to have failed. The first type node is further adapted to request re-transmission of the signal for which decoding has been determined to have failed, and to request re-transmission of all signals having higher decoding error probability than the signal for which decoding has been determined to have failed.

In this manner, end-to-end throughput is increased as well as load balancing since no resources are used for signals with low success probability. This makes it possible to use the free spectrum of the non-decoded signals and improve the reliability/energy efficiency in the next hops. Decoding delay and end-to-end data transmission delay, as well as implementation complexity, are reduced.

According to some aspects, each decoding error probability can additionally or alternatively be based on at least one of a present SNR (Signal to Noise Ratio), a present interference, and a present bandwidth. Each decoding error probability is determined by means of information regarding the corresponding channel.

According to some aspects, each decoding error probability can additionally or alternatively be based on at least one of channel gain and transmit power.

According to some aspects, each estimated decoding error probability is determined based on a corresponding data rate or corresponding code rate. Data rate refers to information bits per time unit and code rate R is R=K/L where K is a number of information bits which are encoded to a codeword of length L.

In this manner, many alternatives are available for determining estimated decoding error probability.

According to some aspects, each estimated decoding error probability is determined based on a corresponding data rate, or a corresponding code rate. Data rate refers to information bits per time unit and code rate R is R=K/L where K is a number of information bits which are encoded to a codeword of length L. Each corresponding channel $\tilde{h}_{10}$, $\tilde{h}_{21}$ and bandwidth in a single time slot are assumed fixed for all signals.

In this manner, many alternatives are available for determining estimated decoding error probability, where channel and bandwidth in a single time slot are assumed fixed for all signals. According to some aspects, when re-transmission occurs, the first type node is adapted to repeat the sorting, decoding and possible re-transmission request procedure for the re-transmitted signals for each re-transmission.

In this manner, the advantages above are maintained.

According to some aspects, the first type node is adapted to buffer all signals for which re-transmission has been requested, and to use these for decoding the re-transmitted signals.

In this manner, decoding reliability and efficiency is enhanced.

According to some aspects, the first type node is adapted to re-encode the decoded signals and to transmit these re-encoded signal to a further first type node with data rates that are adapted to the free spectrum determined to be presently available.

In this manner, load balancing is increased.

According to some aspects, the first type node is adapted to provide data to the other first type nodes involved in transmission of the signals, the data comprising at least one of information regarding decoding status of received signals and updated data transmission procedure, enabling adaptive load balancing in the wireless communication system.

In this manner, load balancing is increased.

According to some aspects, the first type node is adapted for access communication with a corresponding group of second type nodes via a corresponding access channel. Each group of second type nodes comprises at least one second type node. The communication between the first type nodes is a backhaul communication via at least one corresponding backhaul channel. The backhaul communication and the access communication are both performed by means of a common equipment at the first type nodes.

In this manner, an IAB network is obtained.

According to some aspects, the first type node comprises a processor unit that is adapted to estimate the decoding error probability for each signal and to sort the signals in a decoding order according to the estimated decoding error probability. The processor unit is further adapted to decode the signals one at the time from the lowest decoding error probability to the highest decoding error probability until decoding for a certain signal is determined to have failed, request re-transmission of the signal which decoding has been determined to have failed, and to request re-transmission of all signals having higher decoding error probability than the signal which decoding has been determined to have failed.

According to some aspects, a first type of signal relaying is constituted by decoding-encoding forward (DF) relaying of a signal.

This object is also obtained by means of methods that are associated with the above advantages.

BRIEF DESCRIPTION OF THE DRAWINGS

The present disclosure will now be described more in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Network densification takes advantage of wireless backhaul; due to a relatively high installation cost of fiber links, as well as traffic jams and infrastructure displacements, the relatively small application points (APs) need to be supported by high-rate LOS wireless backhaul links which motivates so-called integrated access and backhaul (IAB) networks.

Figure 1:
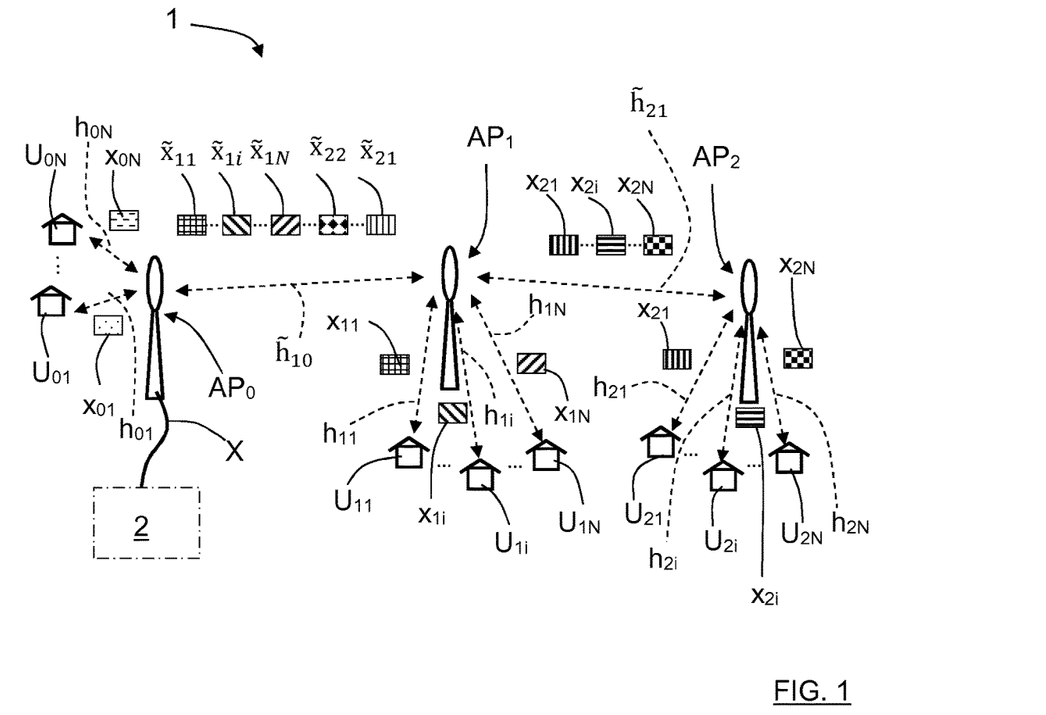
FIG. 1 schematically shows a view of a wireless communication system.

With reference to FIG. 1, there is a wireless communication system 1 comprising an IAB network with two hops. There are first type nodes $AP_0$, $AP_1$, $AP_2$ in the wireless communication system 1, here in the form of a first access point $AP_0$, a second access point $AP_1$ and a third access point $AP_2$. The access points $AP_0$, $AP_1$, $AP_2$ are arranged for communication with each other in the wireless communication system 1 over a corresponding backhaul channel $\tilde{h}_{10}$, $\tilde{h}_{21}$, having a channel quality, generally by means of one of at least one type of signal relaying that employs decoding and encoding. According to some aspects, the signal relaying is constituted by decoding-encoding forward, DF, relaying of a signal.

Each access point $AP_0$, $AP_1$, $AP_2$ is adapted for access communication with a corresponding group of second type nodes $U_{01}$, $U_{0N}$; $U_{11}$, $U_{1i}$, $U_{1N}$; $U_{21}$, $U_{2i}$, $U_{2N}$ via a corresponding access channel hot, $h_{0N}$; $h_{11}$, $h_{1i}$, $h_{1N}$; $h_{21}$, $h_{2i}$, $h_{2N}$, providing wireless access The second type nodes $U_{01}$, $U_{0N}$; $U_{11}$, $U_{1N}$; $U_{21}$, $U_{2i}$, $U_{2N}$ are here in the form of customer-premises equipments (CPEs), and generally each group of CPEs $U_{01}$, $U_{0N}$; $U_{11}$, $U_{1i}$, $U_{1N}$; $U_{21}$, $U_{2i}$, $U_{2N}$ comprises at least one CPE. In FIG. 1, there is a generalized nomenclature where an integer N of CPEs, channels and signals is depicted, where the number N can be different for different access points $AP_0$, $AP_1$, $AP_2$ and different channels. For example, for the third access point $AP_2$ there are CPEs $U_{21}$, $U_{2i}$, $U_{2N}$, where i is any number between 1 and N. In this manner, a general nomenclature is used, although in the example there are three CPEs. Generally, the number N is at least one.

The communication between the access points $AP_0$, $AP_1$, $AP_2$ is a backhaul communication via a corresponding backhaul channel $\tilde{h}_{10}$, $\tilde{h}_{21}$ and in the IAB network, the backhaul communication and the access communication are both performed by means of a common equipment at the access points $AP_0$, $AP_1$, $AP_2$. The a second access point $AP_1$ and the third access point $AP_2$ are wirelessly backhauled by the first access point $AP_0$ connecting to a core network 2 using a fiber connection 5.

In IAB networks, uplink (UL) and downlink (DL) transmission does not follow the common definition, as both endpoints of the backhaul links are access points. However, for simplicity, we refer to data transmission towards (resp. from) the first access point $AP_0$ as UL (resp. DL) transmission.

Considering FIG. 1 the discussions relate to UL transmission from the CPEs $U_2i$, $\forall i$, served by the third access point $AP_2$, to the first access point $AP_0$. However, the same discussions can be applied for DL transmission as well. Also, we present the setup for time-division multiple access (TDMA) setup. However, the same scheme can also be adapted for other resource allocation approaches such as for example frequency-division multiple access (FDMA) and code-division multiple access (CDMA).

As the number of hops/CPEs per hop increases, the APs need to transfer an aggregated data of multiple CPEs accumulated from the previous hops. As a result, the AP-AP backhaul links are heavily loaded, which may lead to high decoding complexity/delay and buffering cost for the APs as well as large end-to-end transmission delay/low end-to-end throughput for the CPEs.

Figure 2A:
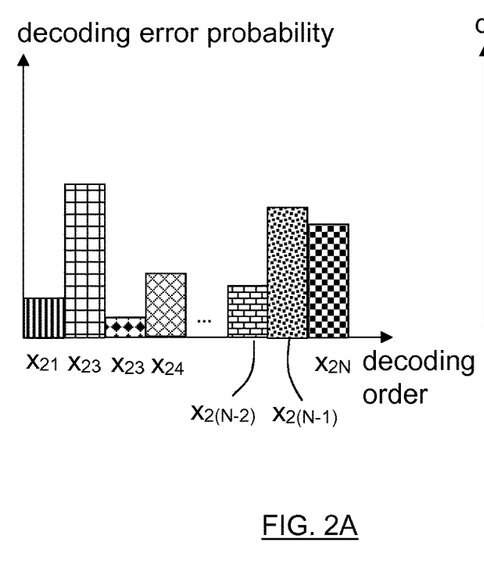
FIG. 2A schematically shows decoding order versus decoding error probability before sorting.

In the present example, the second access point $AP_1$ is adapted to receive a plurality of signals $x_{21}$. $x_{22}$, $x_{23}$, $x_{24}$, $x_{2(n-2)}$; $x_{2(N-1)}$, $x_{2N}$, each signal being associated with a corresponding decoding error probability, from third access point $AP_2$ as illustrated in FIG. 2A which shows decoding order as a function of decoding error probability.

Figure 2B:
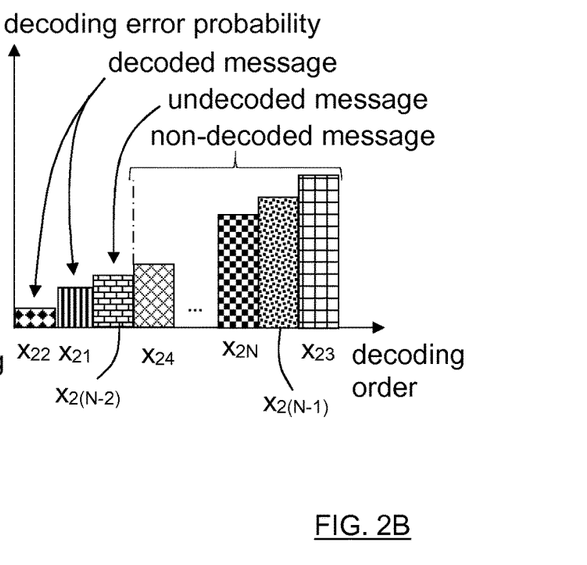
FIG. 2B schematically shows decoding order versus decoding error probability after sorting.

According to the present disclosure, the second access point $AP_1$ is adapted to estimate the decoding error probability for each signal received $x_{21}$, $x_{22}$, $x_{23}$, $x_{24}$, $x_{2(N-2)}$; $x_{2(N-1)}$, $x_{2N}$ and to sort the signals $x_{21}$, $x_{22}$, $x_{23}$, $x_{24}$, $x_{2(N-2)}$; $x_{2(N-1)}$, $x_{2N}$ in a decoding order according to the estimated decoding error probability as shown in FIG. 2B.

The second access point $AP_1$ is further adapted to decode the signals one at the time from the lowest estimated decoding error probability to the highest estimated decoding error probability until decoding for a certain signal is determined to have failed. The second access point $AP_1$ is then adapted to request re-transmission of the signal for which decoding has been determined to have failed, and to request re-transmission of all signals having higher decoding error probability than the signal for which decoding has been determined to have failed.

According to some aspects, each estimated decoding error probability is determined based on a corresponding data rate or code rate.

In this context, according to some further aspects, the term data rate refers to information bits per time unit (e.g. bits per second). The data rate depends on code rate, the modulation scheme and the channel. Code rate has no unit of measurement and is the ratio between the number of information bits and the number of code bits of a codeword and can be written as R=K/L where K is a number of information bits which are encoded to a codeword of length L.

According to some aspects, alliteratively or in combination with the above, each decoding error probability is based on at least one of a present SNR (Signal to Noise Ratio), a present interference, and a present bandwidth, and is determined by means of information regarding the corresponding channel $\tilde{h}_{10}\tilde{h}_{21}$).

According to some aspects, each decoding error probability is based on at least one of, channel gain and transmit power.

According to some aspects, when re-transmission occurs, the second access point $AP_1$ is adapted to repeat the sorting, decoding and possible re-transmission request procedure for the re-transmitted signals for each re-transmission.

According to some aspects, the second access point $AP_1$ is adapted to buffer all signals for which re-transmission has been requested, and to use these for decoding the re-transmitted signals.

According to some aspects, the second access point $AP_1$ is adapted to re-encode the decoded signals and to transmit these re-encoded signal to the first access point $AP_0$ and the third access point $AP_2$ with data rates that are adapted to the free spectrum determined to be presently available.

According to some aspects, the second access point $AP_1$ is adapted to provide data to the first access point $AP^0$ and the third access point $AP_2$ involved in transmission of the signals $x_{01}$, $x_{0N}$; $x_{11}$, $x_1$, $x_{1N}$; $x_{21}$, $x_{2i}$, $x_{2N}$, the data comprising at least one of information regarding decoding status of received signals and updated data transmission procedure, enabling adaptive load balancing in the wireless communication system 1.

Depending on the data rates and the message decoding status of the CPEs $U_{11}$, $U_{1i}$, $U_{1N}$ of the second access point $AP_1$, the second access point $AP_1$ may stop decoding the signals for which a low successful decoding probability is estimated, and request retransmissions, without any further decoding. In this way, the implementation complexity and the data transmission delay are reduced considerably and load balancing can be improved. This is because an AP tries to decode a message only if a high successful decoding probability is estimated. In this way, the resources are not wasted for the signals with low success probability and, instead, are used to improve the load balancing.

The above has been described for the second access point $AP_1$, but is applicable for all APs $AP_0$, $AP_1$, $AP_2$ in uplink and/or downlink. This means that each AP $AP_0$, $AP_1$, $AP_2$ first determines the appropriate order of message decoding such that the messages with low data rates are decoded first. Decoding is performed as long as the messages are correctly decoded. If an AP fails to decode a message, it stops decoding, buffers the failed and the remaining non-decoded messages and, with no message decoding, asks for the retransmission of the non-decoded, and also, failed, messages. Moreover, depending on the decoding status of the messages, the APs $AP_0$, $AP_1$, $AP_2$ adapt the load balancing of their to-send messages and update their timing advance, synchronization and/or transmission parameters. Such adaptive load balancing makes it possible to use the free spectrum of the non-decoded signals and improve the reliability/energy efficiency in the next hops.

In the following discussion, the CPEs associated with $AP_1$ are represented by $U_{ji}$, $\forall i$. Also, $x_{ji}$ denotes the signal sent by $U_{ji}$ and its data rate is represented by $R_{ji}$, which is associated with the size of the data buffered by the CPEs. UL transmission are here considered, where the signals $x_{21} \ldots x_{2N}$ are sent from $AP_2$ to $AP_1$ and then $AP_1$ forwards the accumulated signals $x_1 \ldots x_{1N} x_{21} \ldots x_{2N}$ to $AP_0$. Throughout the discussions, the signals that the APs fail to decode are referred to as "undecoded message." Then, the terminology "non-decoded message" refers to the signals for which the APs ask for retransmission, without message decoding. Using the above terminology, according to some aspects, the present disclosure relates to the following procedure:

Step 1: Assuming that the second access point $AP_1$ has successfully received the signals $x_{11}, \ldots, x_{1i}, x_{1N}$ associated with the CPEs $U_{11}, \ldots, U_{1N}$ associated with the second access point $AP_1$. Then, the second access point $AP_1$ receives the information about the data rates of the CPEs $U_{21}, \ldots, U_{2N}$, associated with the third access point $AP_2$ i.e., $R_{2i}$, $\forall i$, and adapts the decoding order, and possibly its scheduling, such that the messages with the lower data rates are decoded first. As an example, the appropriate decoding order for the messages is given by $x_{22}, x_{21}, x_{2(N-2)}, x_{24} \ldots x_{2N}, x_{2(N-1)}, x_{23}$ as illustrated in FIG. 2B.

Step 2: Receiving the signals $x_{21} \ldots x_{2N}$, $AP_1$ starts message decoding with the selected decoding order and continues decoding as long as the messages are successfully decoded.

Step 3: If the second access point $AP_1$ fails to decode a message, for instance $x_{2(N-2)}$ that is marked as undecoded in FIG. 2B, it stops decoding the remaining messages $x_{24} \ldots x_{2N}, x_{2(N-1)}, x_{23}$ which are marked as non-decoded in FIG. 2B. Then, the second access point $AP_1$ buffers the undecoded and non-decoded messages $x_{2(N-2)}, x_{24} \ldots x_{2N}, x_{2(N-1)}, x_{23}$ and, without decoding the non-decoded messages $x_{24} \ldots x_{2N}, x_{2(N-1)}, x_{23}$, asks for their retransmissions. The second access point $AP_i$ also asks for the retransmission of the undecoded signal $x_{2(N-2)}$). This is because all the received messages $x_{21} \ldots x_{2N}$ reach the second access point $AP_1$ through the same $AP_2$–$AP_1$ channel. Thus, if the second access point $AP_1$ fails to decode a message, there is very high probability that it fails to decode all signals with the data rates equal to or higher than the data rate of the undecoded message. Thus, time and energy is not wasted to decode a message with low successful decoding probability. Instead, the second access point $AP_1$ buffers the remaining undecoded and non-decoded messages and tries decoding in the retransmissions which have higher successful decoding probability.

Step 4: A free spectrum is obtained by not transmitting the undecoded and non-decoded messages $x_{24} \ldots x_{2N}, x_{2(N-1)}, x_{23}$), and the second access point $AP_1$ uses this free spectrum to re-encode all decoded messages $x_{11} \ldots x_{1N} x_{22} x_{21}$ in FIG. 1, to new messages $\tilde{x}_{11} \ldots \tilde{x}_{1N} \tilde{x}_{22} \tilde{x}_{21}$ with possibly lower data rates. Then, these signals are sent to the first access point $AP_0$. Such adaptive load balancing improves the reliability of the $AP_1$–$AP_0$ link or, equivalently, improves the energy efficiency of the second access point $AP_1$.

Step 5: The second access point $AP_1$ informs all APs/CPEs about the message decoding status of the received signals and the updated data transmission procedure.

Step 6: All APs adapt their decoding and buffering schemes according to the received information. Also, the APs/CPEs synchronize their signals and determine their timing advance based on the adapted data transmission/decoding scheme. Moreover, the APs may optimize their transmission parameters, such as beamforming and power allocation, based on the adapted data transmission method.

In this way the present disclosure reduces the decoding complexity and delay because an AP tries decoding a message only when there is a high probability of successful decoding.

The present disclosure is applicable for every HARQ protocol as well as the basic ARQ. With HARQ protocols, the APs buffer the undecoded and non-decoded signals and in each round try to decode the messages based on all copies of the signal accumulated in different retransmission rounds. With basic ARQ, on the other hand, in each round a message is decoded only based on the signal received in that round and, thus, the APs do not need to buffer the previous copies of the undecoded/non-decoded signals.

Transmit power and/or beamforming optimization has not been discussed above. However, along with using the decoding scheme according to the present disclosure, the APs can also optimize the beamforming and power allocation based on the adapted decoding scheme/load balancing. For instance, the second access point $AP_1$ can use the free spectrum of the non-decoded signals to reduce the transmit power which improves its energy efficiency.

IAB systems are of most interest in, e.g., fixed wireless access (FWA) networks with stationary APs/CPEs. As a result, the appropriate decoding order and the proper load balancing for different message decoding conditions can be determined offline. Then, for every message decoding condition, the APs switch immediately to the appropriate transmission/decoding setup with low updating overhead.

Finally, the same discussions are applicable for the cases with different multiplexing schemes, number of hops and both UL and DL transmissions.

According to some aspects, the present disclosure relates to a smart IAB network using hybrid automatic repeat request (HARD). Considering multi-hop setups, the end-to-end data transmission delay and the decoding delay/complexity are intended to be reduced. At the same time, the load balancing in the AP-AP backhaul links is improved and makes it possible to increase the reliability of the AP-AP backhaul links.

An AP first determines the appropriate order of message decoding. Then, if it fails to decode a message, it stops message decoding and, with no decoding, asks for retransmission of the signals with data rates equal to or higher than the rate of the undecoded message. Also, the AP re-encodes the decoded messages to use the free spectrum of the undecoded messages, leading to better load balancing. Finally, all APs/CPEs synchronize their signals and determine their timing advance based on the message decoding status in each AP. In this way, the implementation complexity and the decoding delay of the IAB network are reduced, which results in higher end-to-end throughput.

Using joint adaptive load balancing and smart decoding reduces the implementation complexity and the decoding delay significantly. As a result, the end-to-end data transmission delay is reduced, which leads to higher end-to-end throughput. This may give the chance to increase the number of hops and/or the number of CPEs per hop in multi-hop IAB networks. Also, adaptive load balancing increases the reliability of the AP-AP links or, equivalently, improves the APs' energy efficiency.

Figure 3:
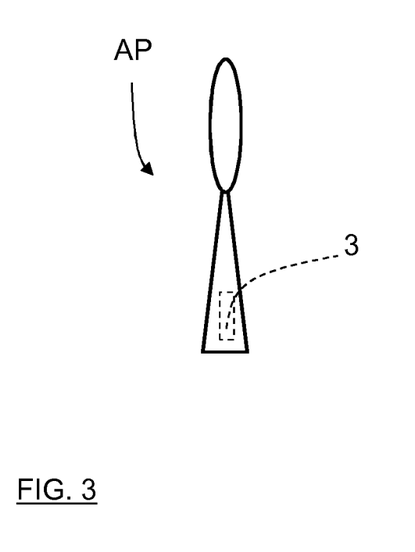
FIG. 3 schematically shows a first type node.

As shown in FIG. 3, according to some aspects, the first type node $AP_0$, $AP_1$, $AP_2$ comprises a processor unit 3 that is adapted to estimate the decoding error probability for each signal $x_{21}$, $x_{22}$, $x_{23}$, $x_{24}$, $x_{2(N-2)}$; $x_{2(N-1)}$, $x_{2N}$, and to sort the signals $x_{21}$, $x_{22}$, $x_{23}$, $x_{24}$, $x_{2(N-2)}$; $x_{2(N-1)}$, $x_{2N}$ in a decoding order according to the estimated decoding error probability.

According to some aspects, the processor unit 3 is adapted to decode the signals one at the time from the lowest estimated decoding error probability to the highest estimated decoding error probability until decoding for a certain signal is determined to have failed.

According to some aspects, the processor unit 3 is adapted to request re-transmission of the signal for which decoding has been determined to have failed, and to request re-transmission of all signals having higher decoding error probability than the signal for which decoding has been determined to have failed.

Figure 4:
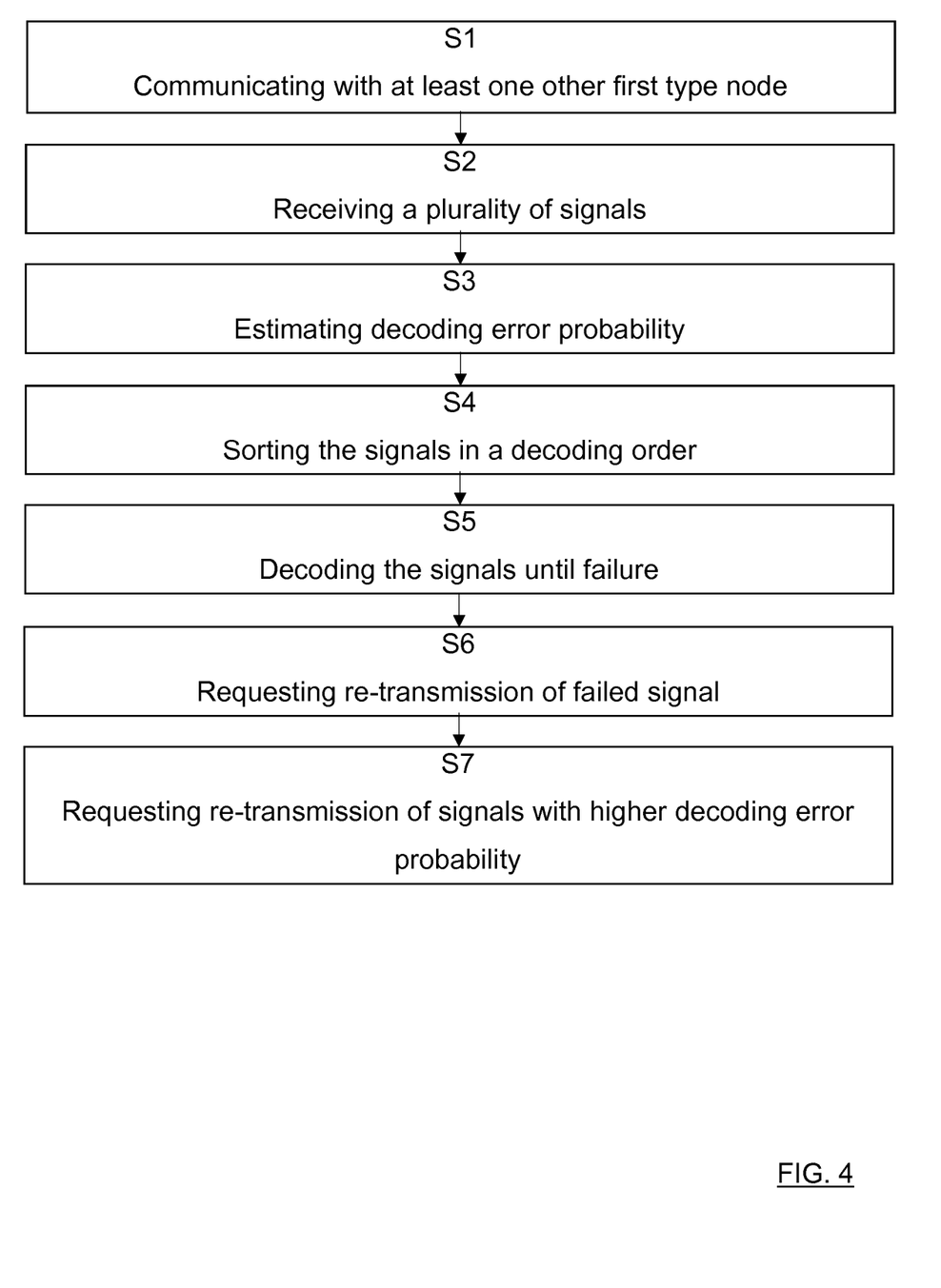
FIG. 4 show a flowchart of methods according to embodiments.

With reference to FIG. 4, the present disclosure relates to method in a first type node $AP_0$, $AP_1$, $AP_2$ in a wireless communication system 1, the method comprising communicating S1 with at least one other first type node $AP_0$, $AP_1$, $AP_2$ in the wireless communication system 1 over a corresponding channel $\tilde{h}_{10}$, $\tilde{h}_{21}$ by means of one of at least one type of signal relaying that employs decoding and encoding, and receiving S2 a plurality of signals $x_{21}$, $x_{22}$, $x_{23}$, $x_{24}$, $x_{2(N-2)}$; $x_{2(N-1)}$, $x_{2N}$. Each signal is associated with a corresponding decoding error probability, from the other first type node $AP_0$, $AP_1$, $AP_2$. The method also comprises estimating S3 the decoding error probability for each signal $x_{21}$, $x_{22}$, $x_{23}$, $x_{24}$, $x_{2(N-2)}$; $x_{2(N-1)}$, $x_{2N}$ and sorting S4 the signals $x_{21}$, $x_{22}$, $x_{23}$, $x_{24}$, $x_{2(N-23)}$; $x_{2(N-1)}$, $x_{2N}$ in a decoding order according to the estimated decoding error probability. The method further comprises decoding S5 the signals one at the time from the lowest estimated decoding error probability to the highest estimated decoding error probability until decoding for a certain signal is determined to have failed, requesting S6 re-transmission of the signal which decoding has been determined to have failed; and requesting S7 re-transmission of all signals having higher decoding error probability than the signal which decoding has been determined to have failed.

According to some aspects, each decoding error probability is based on at least one of a present SNR Signal to Noise Ratio, a present interference, and a present bandwidth. Each decoding error probability is determined by means of information regarding the corresponding channel $\tilde{h}_{10}$, $\tilde{h}_{21}$.

According to some aspects, each decoding error probability is based on at least one of, channel gain and transmit power.

According to some aspects, each estimated decoding error probability is determined based on a corresponding data rate or a corresponding code rate, where data rate refers to information bits per time unit and code rate R is R=K/L where K is a number of information bits which are encoded to a codeword of length L.

According to some aspects, each estimated decoding error probability is determined based on a corresponding data rate or a corresponding code rate, where data rate refers to information bits per time unit and code rate R is R=K/L where K is a number of information bits which are encoded to a codeword of length L, and wherein each corresponding channel $\tilde{h}_{10}$, $\tilde{h}_{21}$ and bandwidth in a single time slot are assumed fixed for all signals $x_{21}$, $x_{22}$, $x_{23}$, $x_{24}$, $x_{2(N-2)}$; $x_{2(N-1)}$, $x_{2N}$.

According to some aspects, when re-transmission occurs, the method comprises repeating the sorting, decoding and possible re-transmission request procedure for the re-transmitted signals for each re-transmission.

According to some aspects, the method comprises buffering all signals for which re-transmission has been requested, and using these for decoding the re-transmitted signals.

According to some aspects, the method comprises re-encoding the decoded signals and transmitting these re-encoded signal to a further first type node $AP_0$, $AP_1$, $AP_2$ with data rates that are adapted to the free spectrum determined to be presently available.

According to some aspects, the method comprises providing data to the other first type nodes $AP_0$, $AP_1$, $AP_2$ involved in transmission of the signals $x_{01}$, $x_{0N}$; $x_{11}$, $x_{1i}x_{1N}$; $x_{21}$, $x_{2i}$, $x_{2N}$, the data comprising at least one of information regarding decoding status of received signals and updated data transmission procedure, enabling adaptive load balancing in the wireless communication system 1.

According to some aspects, the method comprises accessing communication with a corresponding group of second type nodes $U_{01}$, $U_0N$; $U_{1N}$; $U_{21}$, $U_{2i}$, $U_{2N}$ via a corresponding access channel $h_{01}$, $h_{0N}$; $h_{11}$, $h_{1i}$, $h_{1N}$; $h_{21}$, $h_{2i}$, $h_2N$, each group of second type nodes $U_{01}$, $U_{0N}$; $U_{11}$, $U_{1i}$, $U_{1N}$; $U_{21}$, $U_{2i}$, $U_{2N}$ comprising at least one second type node $U_{01}$, $U_{0N}$; $U_{1N}$; $U_{21}$, $U_{2i}$, $U_{2N}$. The communication between the first type nodes $AP_0$, $AP_1$, $AP_2$ is a backhaul communication via at least one corresponding backhaul channel $\tilde{h}_{10}$, $\tilde{h}_{21}$, and the backhaul communication and the access communication are both performed by means of a common equipment at the first type nodes $AP_0$, $AP_1$, $AP_2$.

The present disclosure is not limited to the above, but may vary freely within the scope of the appended claims. For example, each corresponding channel $\tilde{h}_{10}$, $\tilde{h}_{21}$ and bandwidth in a single time slot can according to some aspects be assumed to be fixed for all signals $x_{21}$, $x_{22}$, $x_{23}$, $x_{24}$, $x_{2(N-2)}$; $x_{2(N-1)}$, $x_{2N}$. This is, however, not necessary.

According to some aspects, the present disclosure is applicable for both frequency division duplex (FDD) and time division duplex (TDD) schemes, different HARQ protocols as well as for both uplink (UL) and downlink (DL) transmission.

According to some aspects, the present disclosure can easily extended to the cases with arbitrary number of hops, different relaying approaches or star-like network configuration.

Generally, the present disclosure relates to a first type node $AP_0$, $AP_1$, $AP_2$ in a wireless communication system 1, wherein the first type node $AP_0$, $AP_1$, $AP_2$ is adapted to communicate with at least one other first type node $AP_0$, $AP_1$, $AP_2$ in the wireless communication system 1 over a corresponding channel $\tilde{h}_{10}$, $\tilde{h}_{21}$ by means of one of at least one type of signal relaying that employs decoding and encoding, and to receive a plurality of signals $x_{21}$, $x_{22}$, $x_{23}$, $x_{24}$, $x_{2(N-2)}$; $x_{2(N-1)}$, $x_{2N}$, each signal being associated with a corresponding decoding error probability, from the other first type node $AP_0$, $AP_1$, $AP_2$, and to estimate the decoding error probability for each signal $x_{21}$, $x_{22}$, $x_{23}$, $x_{24}$, $x_{2(N-2)}$; $x_{2(N-1)}$, $x_{2N}$. The first type node $AP_0$, $AP_1$, $AP_2$ is also adapted to sort the signals $x_{21}$, $x_{22}$, $x_{23}$, $x_{24}$, $x_{2(N-2)}$; $x_{2(N-)}$, $x_{2N}$ in a decoding order according to the estimated decoding error probability, and to decode the signals one at the time from the lowest estimated decoding error probability to the highest estimated decoding error probability until decoding for a certain signal is determined to have failed. The first type node $AP_0$, $AP_1$, $AP_2$ is further adapted to request re-transmission of the signal for which decoding has been determined to have failed, and to request re-transmission of all signals having higher decoding error probability than the signal for which decoding has been determined to have failed.

According to some aspects, each decoding error probability can additionally or alternatively be based on at least one of a present SNR (Signal to Noise Ratio), a present interference, and a present bandwidth. Each decoding error probability is determined by means of information regarding the corresponding channel $\tilde{h}_{10}$, $\tilde{h}_{21}$.

According to some aspects, each decoding error probability can additionally or alternatively be based on at least one of channel gain and transmit power.

According to some aspects, each estimated decoding error probability is determined based on a corresponding data rate or corresponding code rate. Data rate refers to information bits per time unit and code rate R is R=K/L where K is a number of information bits which are encoded to a codeword of length L.

According to some aspects, each estimated decoding error probability is determined based on a corresponding data rate, or a corresponding code rate. Data rate refers to information bits per time unit and code rate R is R=K/L where K is a number of information bits which are encoded to a codeword of length L. Each corresponding channel $\tilde{h}_{10}$, $\tilde{h}_{21}$ and bandwidth in a single time slot are assumed fixed for all signals $x_{21}$, $x_{22}$, $x_{23}$, $x_{24}$, $x_{2(N-2)}$; $x_{2(N-1)}$, $x_{2N}$.

According to some aspects, when re-transmission occurs, the first type node $AP_0$, $AP_1$, $AP_2$ is adapted to repeat the sorting, decoding and possible re-transmission request procedure for the re-transmitted signals for each re-transmission.

According to some aspects, the first type node $AP_0$, $AP_1$, $AP_2$ is adapted to buffer all signals for which re-transmission has been requested, and to use these for decoding the re-transmitted signals.

According to some aspects, the first type node $AP_0$, $AP_1$, $AP_2$ is adapted to re-encode the decoded signals and to transmit these re-encoded signal to a further first type node $AP_0$, $AP_1$, $AP_2$ with data rates that are adapted to the free spectrum determined to be presently available.

According to some aspects, the first type node $AP_0$, $AP_1$, $AP_2$ is adapted to provide data to the other first type nodes $AP_0$, $AP_1$, $AP_2$ involved in transmission of the signals $x_{01}$, $x_{0N}$; $x_{11}$, $x_{1i}$, $x_{1N}$; $x_{21}$, $x_{2i}$, $x_{2N}$, the data comprising at least one of information regarding decoding status of received signals and updated data transmission procedure, enabling adaptive load balancing in the wireless communication system 1.

According to some aspects, the first type node $AP_0$, $AP_1$, $AP_2$ is adapted for access communication with a corresponding group of second type nodes $U_{01}$, $U_{0N}$; $U_{11}$, $U_{1i}$, $U_{1N}$; $U_{21}$, $U_{2i}$, $U_{2N}$ via a corresponding access channel $h_{01}$, $h_{0N}$; $h_{11}$, $h_{1i}$, $h_{1N}$; $h_{21}$, $h_{2i}$, $h_{2N}$, each group of second type nodes $U_{01}$, $U_{0N}$; $U_{11}$, $U_{1i}$, $U_{1N}$; $U_{21}$, $U_{2i}$, $U_{2N}$ comprising at least one second type node $U_{01}$, $U_{0N}$; $U_{11}$, $U_{1i}$, $U_{1N}$; $U_{21}$, $U_{2i}$, $U_{2N}$. The communication between the first type nodes $AP_0$, $AP_1$, $AP_2$ is a backhaul communication via at least one corresponding backhaul channel $\tilde{h}_{10}$, $\tilde{h}_{21}$. The backhaul communication and the access communication are both performed by means of a common equipment at the first type nodes $AP_0$, $AP_1$, $AP_2$.

According to some aspects, the first type node $AP_0$, $AP_1$, $AP_2$ comprises a processor unit 3 that is adapted to estimate the decoding error probability for each signal $x_{21}$, $x_{22}$, $x_{23}$, $x_{24}$, $x_{2(N-2)}$; $x_{2(N-1)}$, $x_{2N}$ and to sort the signals $x_{21}$, $x_{22}$, $x_{23}$, $x_{24}$, $x_{2(N-2)}$; $x_{2(N-1)}$; $x_{2N}$ in a decoding order according to the estimated decoding error probability. The processor unit 3 is further adapted to decode the signals one at the time from the lowest decoding error probability to the highest decoding error probability until decoding for a certain signal is determined to have failed, request re-transmission of the signal which decoding has been determined to have failed, and to request re-transmission of all signals having higher decoding error probability than the signal which decoding has been determined to have failed.

According to some aspects, a first type of signal relaying is constituted by decoding-encoding forward (DF) relaying of a signal.

The invention claimed is:

1. A first type node in a wireless communication system, the first type node is being configured to:
   communicate with at least one other first type node in the wireless communication system over a corresponding channel by means of one of at least one type of signal relaying that employs decoding and encoding;
   receive a plurality of signals, each signal being associated with a corresponding decoding error probability, from the other first type node;
   estimate the decoding error probability for each signal;
   sort the signals in a decoding order according to the estimated decoding error probability;
   decode the signals one at the time from the lowest estimated decoding error probability to the highest estimated decoding error probability until decoding for a certain signal is determined to have failed;
   request re-transmission of the signal for which decoding has been determined to have failed; and
   request re-transmission of all signals having higher decoding error probability than the signal for which decoding has been determined to have failed.

2. The first type node according to claim 1, wherein each decoding error probability is based on at least one of:
   a present SNR, Signal to Noise Ratio;
   a present interference; and
   a present bandwidth,
   and is determined by means of information regarding the corresponding channel.

3. The first type node according to claim 1, wherein each decoding error probability is based on at least one of channel gain and transmit power.

4. The first type node according to claim 1, wherein each estimated decoding error probability is determined based on a corresponding data rate or corresponding code rate, where data rate refers to information bits per time unit and code rate R is R=K/L where K is a number of information bits which are encoded to a codeword of length L.

5. The first type node according to claim 1, wherein each estimated decoding error probability is determined based on one of a corresponding data rate and a corresponding code rate, where data rate refers to information bits per time unit and code rate R is R=K/L where K is a number of information bits which are encoded to a codeword of length L, and wherein each corresponding channel and bandwidth in a single time slot are assumed fixed for all signals.

6. The first type node according to claim 1, wherein, when re-transmission occurs, the first type node is adapted to repeat the sorting, decoding and possible re-transmission request procedure for the re-transmitted signals for each re-transmission.

7. The first type node according to claim 1, wherein the first type node is configured to buffer all signals for which re-transmission has been requested, and to use these for decoding the re-transmitted signals.

8. The first type node according to claim 1, wherein the first type node is configured to re-encode the decoded signals and to transmit these re-encoded signal to a further first type node with data rates that are adapted to the free spectrum determined to be presently available.

9. The first type node, according to claim 1, wherein the first type node is configured to provide data to the other first type nodes involved in transmission of the signals, the data comprising at least one of information regarding decoding status of received signals and updated data transmission procedure, enabling adaptive load balancing in the wireless communication system.

10. The first type node, according to claim 1, wherein the first type node, is configured for access communication with a corresponding group of second type nodes via a corresponding access channel, each group of second type nodes comprising at least one second type node, where the communication between the first type nodes is a backhaul communication via at least one corresponding backhaul channel and where the backhaul communication and the access communication both are performed by means of a common equipment at the first type nodes.

11. The first type node according to claim 1, wherein the first type node comprises a processor unit that is configured to:
   estimate the decoding error probability for each signal;
   sort the signals in a decoding order according to the estimated decoding error probability;
   decode the signals one at the time from the lowest decoding error probability to the highest decoding error probability until decoding for a certain signal is determined to have failed;
   request re-transmission of the signal which decoding has been determined to have failed; and
   request re-transmission of all signals having higher decoding error probability than the signal which decoding has been determined to have failed.

12. The first type node according to claim 1, wherein a first type of signal relaying is constituted by decoding-encoding forward, DF, relaying of a signal.

13. A method in a first type node in a wireless communication system, the method comprising:
   communicating with at least one other first type node in the wireless communication system over a corresponding channel by means of one of at least one type of signal relaying that employs decoding and encoding;
   receiving a plurality of signals, each signal being associated with a corresponding decoding error probability, from the other first type node;
   estimating the decoding error probability for each signal;
   sorting the signals in a decoding order according to the estimated decoding error probability;
   decoding the signals one at the time from the lowest estimated decoding error probability to the highest estimated decoding error probability until decoding for a certain signal is determined to have failed;
   requesting re-transmission of the signal which decoding has been determined to have failed; and
   requesting re-transmission of all signals having higher decoding error probability than the signal which decoding has been determined to have failed.

14. The method according to claim 13, wherein each decoding error probability is based on at least one of:
   a present SNR, Signal to Noise Ratio,
   a present interference, and
   a present bandwidth,
and is determined by means of information regarding the corresponding channel.

15. The method according to claim 13, wherein each decoding error probability is based on at least one of channel gain and transmit power.

16. The method according to claim 13, wherein each estimated decoding error probability is determined based on a corresponding data rate or a corresponding code rate, where data rate refers to information bits per time unit and code rate R is R=K/L where K is a number of information bits which are encoded to a codeword of length L.

17. The method according to claim 13, wherein each estimated decoding error probability is determined based on one of a corresponding data rate and a corresponding code rate, where data rate refers to information bits per time unit and code rate R is R=K/L where K is a number of information bits which are encoded to a codeword of length L, and wherein each corresponding channel and bandwidth in a single time slot are assumed fixed for all signals.

18. The method according to claim 13, wherein, when re-transmission occurs, the method comprises repeating the sorting, decoding and possible re-transmission request procedure for the re-transmitted signals for each re-transmission.

19. The method according to claim 13, wherein the method comprises buffering all signals for which re-transmission has been requested, and using these for decoding the re-transmitted signals.

20. The method according to claim 13, wherein the method comprises re-encoding the decoded signals and transmitting these re-encoded signal to a further first type node with data rates that are adapted to the free spectrum determined to be presently available.

* * * * *